United States Patent [19]

Gygax et al.

[11] Patent Number: 4,482,255
[45] Date of Patent: Nov. 13, 1984

[54] TIMEPIECE FOR DISPLAYING BOTH TIME AND ORIENTATION OF THE TIMEPIECE RELATIVE TO THE TERRESTRIAL MAGNETIC FIELD

[75] Inventors: Claude-André Gygax, Evilard; Pierre-Ernest Jaccard, Sonceboz; Jean-Pierre Jaunin, La Neuveville, all of Switzerland

[73] Assignee: Omega, S.A., Bienne, Switzerland

[21] Appl. No.: 437,067

[22] Filed: Oct. 27, 1982

[30] Foreign Application Priority Data

Oct. 30, 1981 [FR] France ................................ 81 20767

[51] Int. Cl.³ .............................................. G04B 47/00
[52] U.S. Cl. ........................................ 368/10; 368/14; 368/223; 368/228
[58] Field of Search .................... 368/10, 14, 223, 228, 368/239, 241

[56] References Cited

U.S. PATENT DOCUMENTS 3,197,880  8/1965  Rice et al. ............................ 33/204

FOREIGN PATENT DOCUMENTS 2742242  3/1979  Fed. Rep. of Germany .
1597411  9/1981  United Kingdom .

Primary Examiner—Bernard Roskoski
Attorney, Agent, or Firm—Griffin, Branigan & Butler

[57] ABSTRACT

A timepiece is provided which in addition to indicating information concerning the time and the date furnishes information relating to the direction and sense of the terrestrial magnetic field. The display is provided with an arrow which may be permanent or displayed at the will of the user and which indicates in which sense the display must be turned in order to align a fixed axis with the direction of the terrestrial field. An azimuth indication may appear giving the angle between the direction north and the route followed. A built in static detector picks up indications of the magnetic field.

14 Claims, 12 Drawing Figures

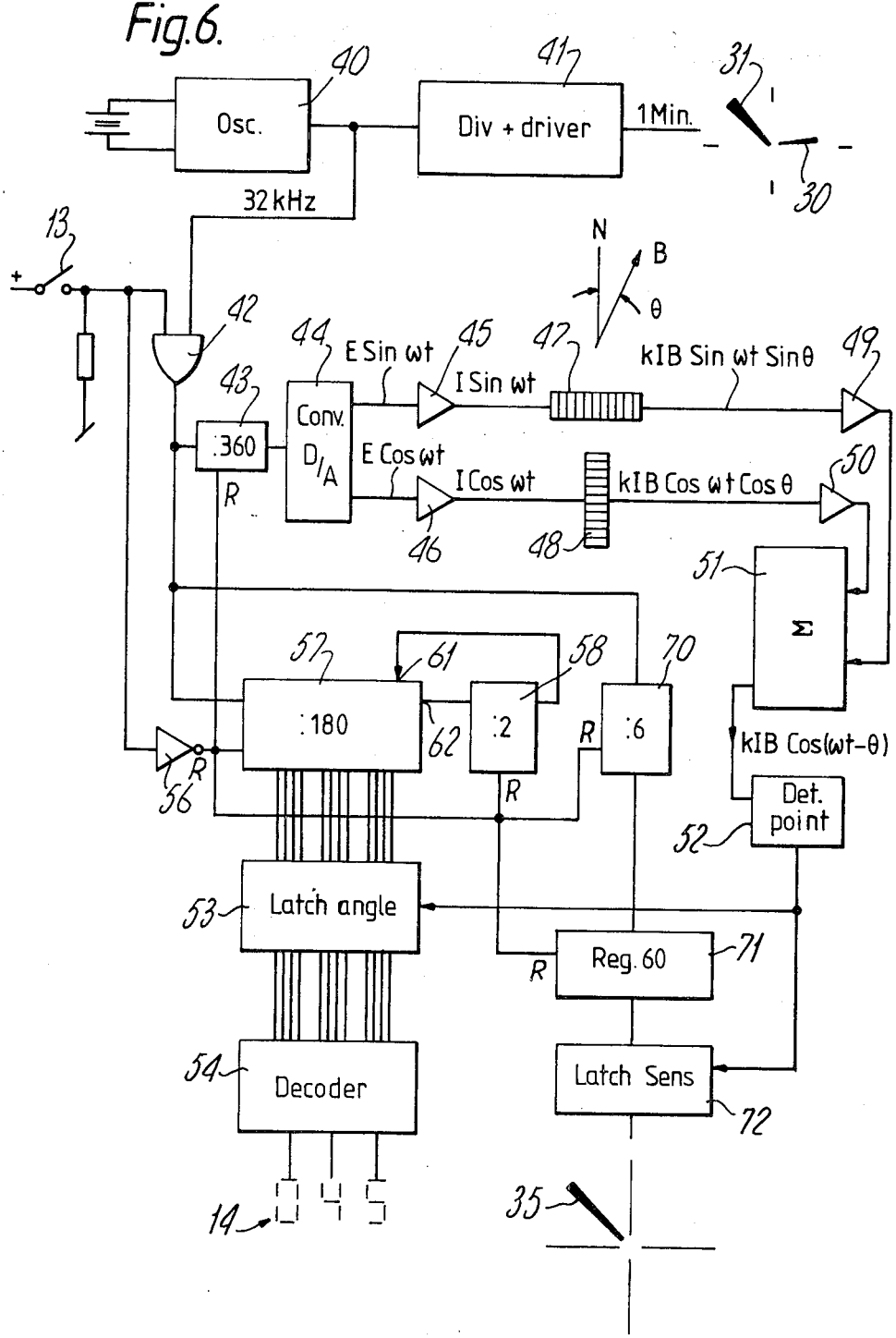

TIMEPIECE FOR DISPLAYING BOTH TIME AND ORIENTATION OF THE TIMEPIECE RELATIVE TO THE TERRESTRIAL MAGNETIC FIELD

BACKGROUND OF THE INVENTION

This invention concerns a timepiece comprising a display arranged to display time data and orientation means sensitive to the direction and sense of the terrestrial magnetic field.

Such arrangements are already known. Referring for example to the French patent application No. 2 438 861 and in particular to FIG. 1 of such application, there may be seen a wrist-watch comprising a dial, of which one portion is employed for digital display of the time by means of a known electronic arrangement and another portion is occupied by a compass which employs a magnetized needle in order to indicate the direction of the magnetic north. As a variant, the cited application proposes the juxtaposition of the compass and a classic analog display comprising hands driven by a stepping motor.

The timekeeping elements and compass with a magnetized needle are also shown in Swiss Pat. No. 346 826, but superposed one over the other, the compass including in addition means for regulating the declination, thereby enabling allowance for the angle which exists between the true north and the magnetic north, and finally, a rotating bezel permitting one to follow a known direction relative to the north.

Such arrangements present the disadvantage of being cumbersome and fragile. Effectively, should one wish to assure a certain precision in aiming the device during a direction finding exercise for instance, it would be necessary to have available a compass needle with a certain length, this condition not being normally fulfilled by the first arrangement proposed hereinabove in which the compass element as miniaturized may indicate only very approximately the direction to be followed. If the second arrangement as cited undoubtedly permits a better precision concerning the direction to be followed, it will be immediately noticed that it is fairly cumbersome since it employs the entire surface of the watch. Moreover, the construction and design of such arrangements requires particular care should one wish to obtain reproducible indications. Thus, there will be required for instance precision pivots which consequently will be shock sensitive and fragile. On the other hand, a compass with a magnetic needle which may be of real use requires a damping of its needle either by a brake using Foucault currents or by means of a liquid which, it will be readily understood, brings about certain complications in the construction and increases the encumbrance. Finally, a mechanical orientation device is poorly adapted to an otherwise completely electronic watch since it reintroduces moving mechanical elements to a product where these have been otherwise eliminated.

The purpose of the present invention is to overcome the hereinabove disadvantages by employing means as fully set forth in the claims.

BRIEF DESCRIPTION OF THE DRAWINGS

FIG. 3b represents to a large scale a sensitive element of the detecting means of FIG. 3a.

FIG. 6 is a circuit drawing representing the functioning of the timepiece as illustrated in FIGS. 2a and 2b.

DETAILED DESCRIPTION OF THE INVENTION

Figure 1A:
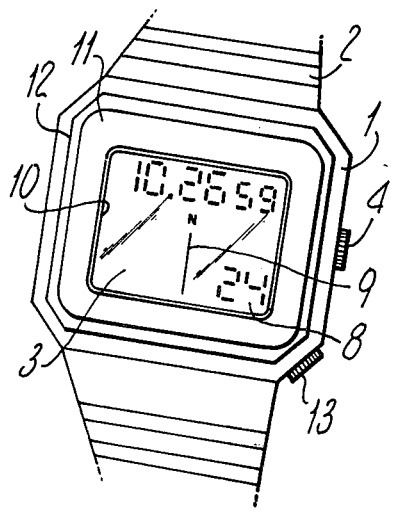
FIGS. 1a to 1d represent a first variant of the timepiece according to the invention.

As will be seen in FIGS. 1a to 1d, the timepiece includes a watch-case 1 to which is attached a bracelet 2 and which has therein a display 3 appearing under a protective glass. The watch may comprise a time setting system 4 in order to correct the indication of hours 5, minutes 6 and seconds 7 as well as the date 8. In the example shown on FIGS. 1a to 1d, the time and date indications appear in digital form by means of segments provided in a liquid crystal cell. One may add to the above-mentioned indications a display of elapsed time, alarm time, etc. In accordance with the preferred version of the invention, time indication only will normally appear on the display as may be seen from FIG. 1a.

As is also apparent from FIGS. 1a to 1d, the timepiece includes a fixed axis 9 which may be engraved or transferred onto the interior surface of the glass or may also be formed by a segment incorporated into the liquid crystal cell. This axis may also be provided by an edge 10 of the mask 11 or an edge 12 of the case-band. In the example shown on the figures, the fixed axis 9 is surmounted by a letter N indicating the direction north. As may be seen on the same figures, the watch is provided with a supplementary control switch 13 which may take the form of a pushbutton.

Figure 1B:
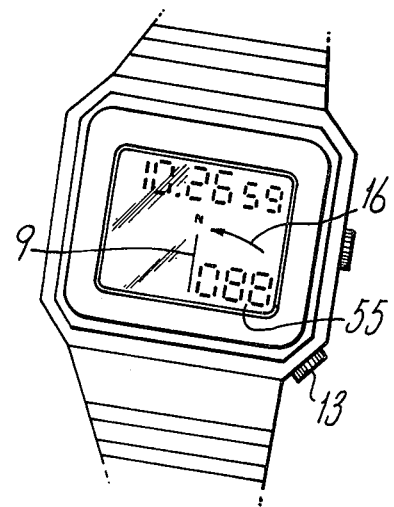
Figure 1C:
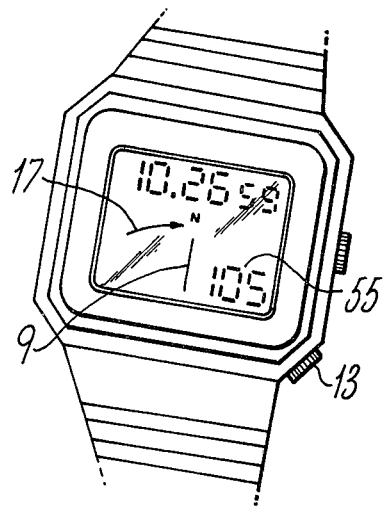
Figure 1D:
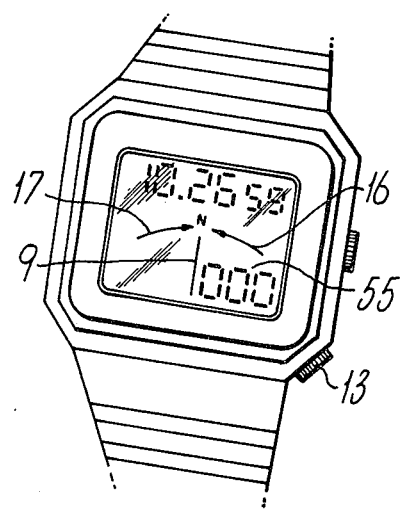

When the pushbutton 13 is actuated, the display of the watch will cause the appearance, in addition to the timekeeping indications of hours, minutes and seconds which are maintained, indications relative to the direction of the terrestrial magnetic field as shown on FIGS. 1b to 1d. In this case, an area 55 comprising three digits is displayed to the right of the fixed axis 9. As seen in FIG. 1b, area 55 is also surmounted by an arrow 16 which appears on the display. These indications represent the angle in degrees or the azimuth which the fixed axis 9 assumes relative to the north and which may be read on the displayed digits of area 55 and additionally the direction in which the watch must be turned in order to align the fixed axis 9 with north if one makes reference to the point of the arrow.

Thus, in the example of FIG. 1b, the fixed axis 9 makes an angle of 88° with the north and it will be necessary to turn the watch in the sense of the arrow 16 in order to have the axis coincide with the north. In other words, the indication given by area 55 (88°) and the presence of arrow 16 signify that if, from the place where one is located, one directs oneself in the sense of the fixed axis 9, this direction will be that of the azimuth 88°. FIG. 1d shows how the display will appear at the moment of coincidence: all the digits of area 55 are zero and, in addition to the first arrow 16 there appears a second arrow 17, the point of which is directed against the point of the first arrow 16. It is however clear that in such a situation one could also eliminate the two arrows since the digits by their value of zero indicate the coincidence situation. Should one now consider FIG. 1c, it will be understood that the fixed axis 9 is directed according to the azimuth 105° west and should one wish to align the aforesaid axis to the direction of the terrestrial magnetic field, it will be necessary to turn the timepiece according to arrow 17 until the area 55 indicates zero. At this instant, one will obtain the situation shown in respect of FIG. 1d.

Figure 3A:
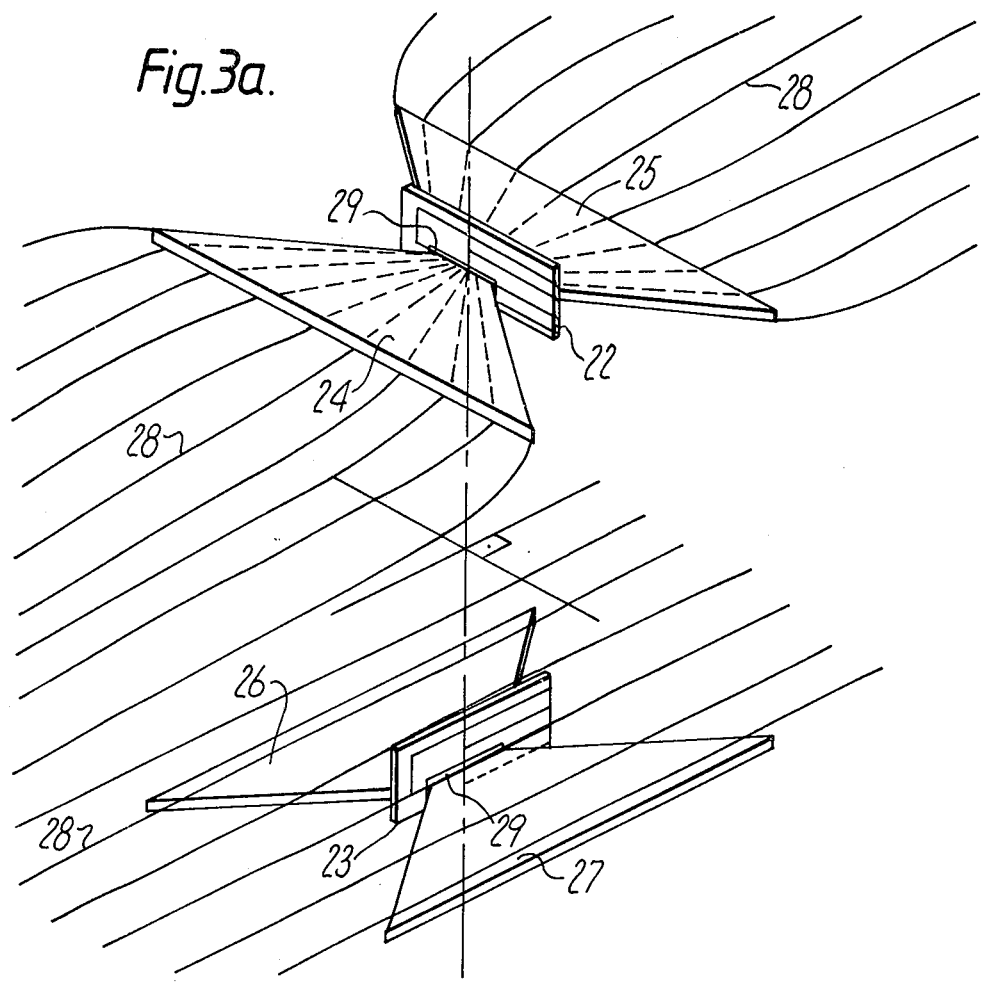
FIG. 3a shows in perspective and to enlarged scale the arrangement for detecting the terrestrial magnetic field as used in the timepiece illustrated in FIGS. 1a to 1d and 2a and 2b.

The indications relative to the direction and sense of the terrestrial magnetic field which appear on the display as has just been seen are obtained in accordance with the invention from means comprising a static detector. Semiconductor means may be employed in order to form such detector. In the orientation arrangement of this invention, there is to be measured the horizontal component and the sense of the terrestrial magnetic field. In order to obtain these, there will be preferably used as shown in FIG. 3a two non-coplanar Hall effect sensors orthogonally arranged relative to one another since a single such sensor is not capable of obtaining without ambiguity the direction, sense and intensity of the magnetic flux unless such flux is perpendicular to the sensitive surface of the detector. These detectors comprising for instance indium arsenide or indium antimonyide are easy to manufacture and may be obtained in extremely small dimensions. They are thus suitable to be adapted to the reduced volume available in a wristwatch.

Figure 3B:
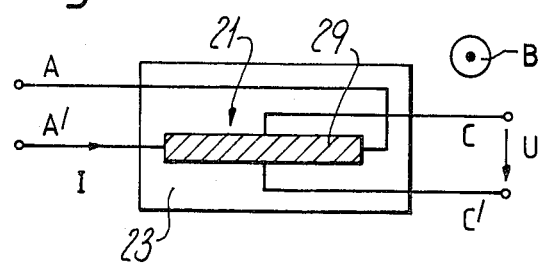

FIG. 3b is an elevation view of such a sensor 23 having an active portion 21. If the sensitive surfaces 29 are subject to a magnetic induction B perpendicular to the plane of the figure and if the first electrodes A—A' are fed with current I, there will be obtained at the terminals of the second electrodes C—C' a voltage $U = K \cdot B \cdot I$.

An electronic compass utilizing two Hall effect sensors placed orthogonally relative to one another has already been described starting on page 112 in the review "Electronics" of Dec. 18, 1980 in an article entitled: "Hall Compass Points Digitally To Headings". In this article, however, no indication is given concerning the possible integration of such a system into a timepiece; in particular, the display is limited to the indication of an angle without indicating how it may be added to or combined with other indications such as the hour and the date, which may be included in a watch. The present invention takes up the basic principle shown in the cited article while adapting it to the special conditions which must be observed in order to integrate it into a watch.

FIG. 3a shows in perspective and to a large scale an arrangement for the detection of the terrestrial magnetic field such as may be used in a timepiece. It comprises two static detectors 22 and 23 identical to that described in respect of FIG. 3b. On both the respective sensitive surfaces 29 on each of these detectors 22 and 23 are arranged flux concentrators in the form of funnels 24, 25 and 26. 27. These concentrators enable the increasing of the intensity of the terrestrial magnetic field (represented by the lines of force 28) at the sensitive surfaces 29. They comprise magnetic material of an extremely permeable nature. As is shown in FIG. 3a, the detectors are orthogonal to one another and detector 22 is shown positioned in order to present its sensitive surfaces 29 perpendicular to the principal direction of the terrestrial magnetic field whereby the voltage U obtained at the terminals of its electrodes C—C' (see FIG. 3b) is at a maximum. Detector 23 which is normal to detector 22 will produce no signal since it does not intercept a line of force 28. Measurements made on this system equipped with concentrators of which the dimensions are compatible with the space disposable in a watch have shown an increase in the magnetic induction of approximately ten times thus bringing said induction to a value on the order of $5 \cdot 10^{-4}$ Tesla.

It is clear that in order to assure proper operation of the detector certain special precautions must be taken at the time it is integrated into the timepiece. It will be necessary for instance to house the timepiece module in a case of plastic material or of non-magnetic metallic material. In the same manner, if the time display is effected by means of hands driven by a stepping motor, it will be necessary to shield the motor in order to avoid that it radiate a parasitic field and the motor will be arranged relative to the detector in a place where the terrestrial filed is not disturbed by the shielding. Effectively, these precautions could be the same as those which have been mentioned in the French patent application No. 2 438 861 already mentioned where it was a matter of not disturbing the magnetized needle by the presence of the stepping motor.

Figure 2A:
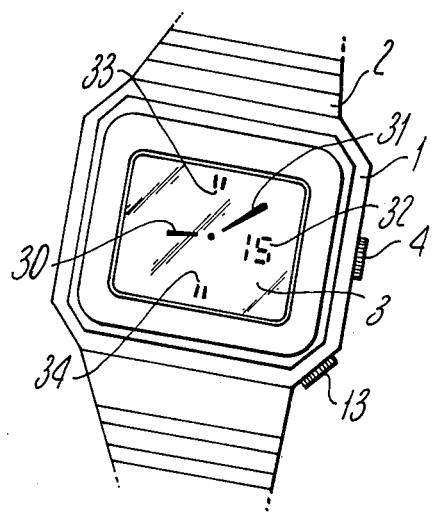
FIGS. 2a and 2b represent a second variant of the timepiece according to the invention.
Figure 2B:
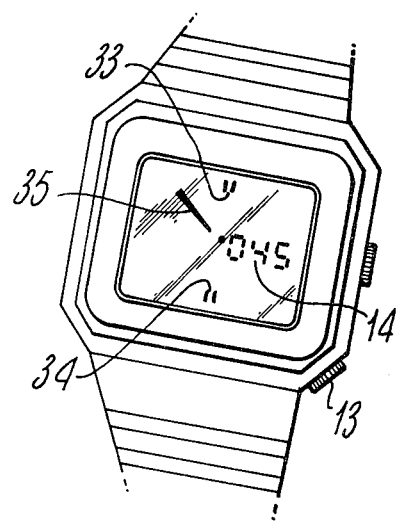

FIGS. 2a and 2b represent a second variant of the timepiece according to the invention which in this case comprises a case 1 to which is attached a bracelet 2 and wherein is provided a display 3 under a protective glass. In FIG. 2a, the indications of hours 30 and minutes 31 is in the analog form and the date 32 in the digital form. Time setting is realized by means of the crown 4. In the preferred arrangement, the time and date are displayed by means of a liquid crystal cell.

The timepiece in addition comprises a fixed axis obtained by reference points 33 and 34 situated at 12 o'clock and 6 o'clock which may form a part of the liquid crystal cell or may be engraved on the internal surface of the glass. The orientation arrangement is placed into operation by actuating the switch 13. The display then will be as shown in FIG. 2b. At this moment the magnetic field detector as has been described in respect of FIG. 3a will transmit its data to the display by means of the minutes indicator 31 which accordingly loses its time data function and will be aligned in the direction north forming the stroke 35, the outer extremity of which indicates north. The digital display 14 then indicates the angle between the fixed axis formed by the reference points 33 and 34 with north, that is to say, on the example of FIG. 2b, 45° east. The sense in which it is necessary to turn the watch in order to bring into coincidence the fixed axis with the north direction is immediately visible on the display (on the example, turn the watch in the counter-clockwise sense).

Thus, in this version, the direction and the sense of the terrestrial magnetic field are obtained by a stroke 35 normally used as a minutes indicator 31 when the watch displays time. In order to avoid confusion, either the hours indicator 30 may be suppressed as appears on the figure, or this may be aligned with the indicator 31 in a sense diametrically opposed thereto.

In the two variants shown in FIGS. 1a to 1d and in FIGS. 2a and 2b, it will be understood that the indication of the azimuth in digital form is not indispensable if it is merely a matter of orienting a map relative to the place where one is located. This indication is however very useful in a case where a known direction must be followed and a map is not available. In such case, the watch is oriented until it displays the given azimuth, then one may follow the direction indicated by the fixed axis which is the axis sought or the axis of displacement. In such case, the compass may be advantageously completed by a mirror which enables spotting a reference point on the terrain indicating the direction to be followed as explained in Swiss Pat. No. 346 826 cited above.

Figure 4:
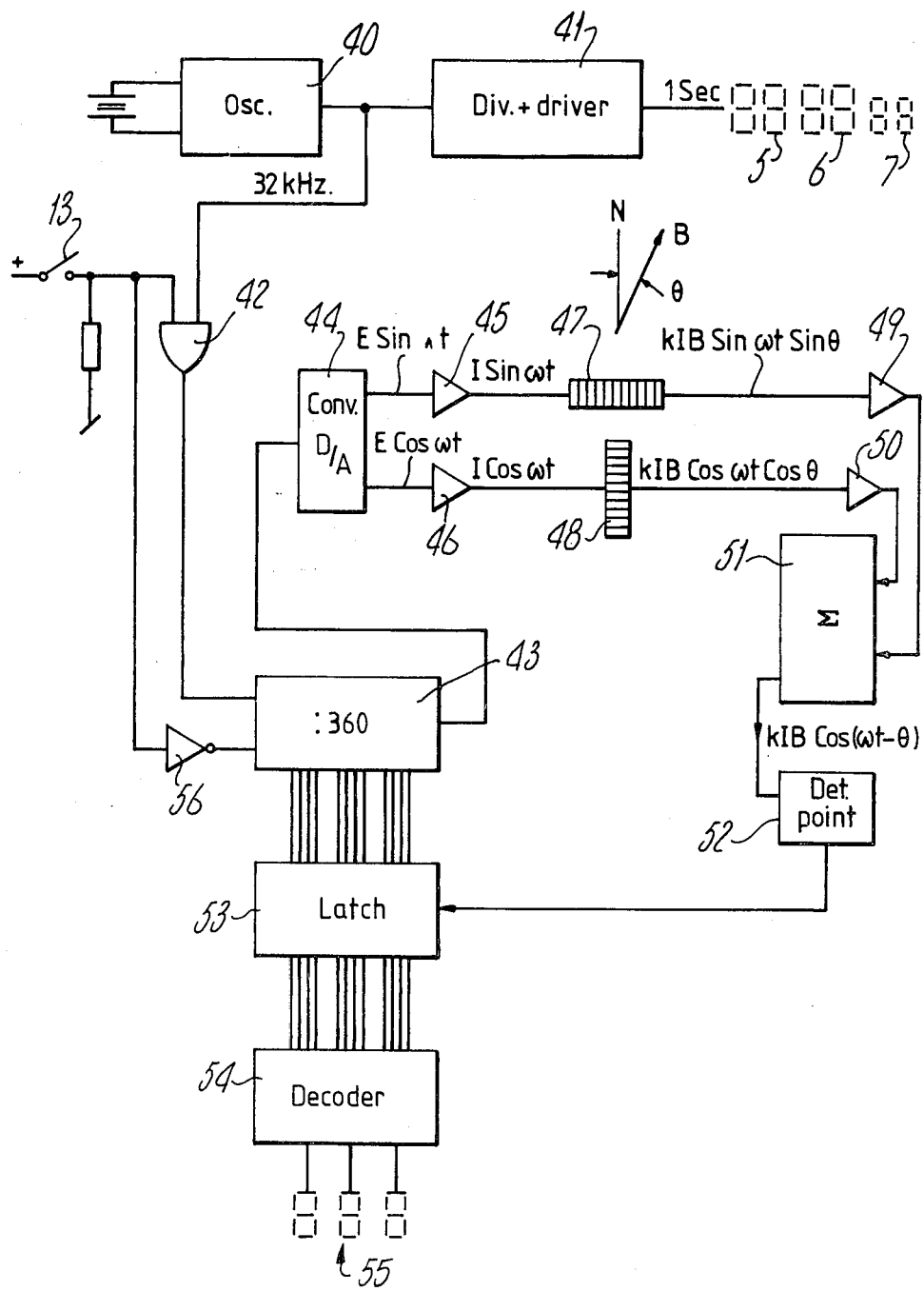
FIG. 4 is a schematic circuit diagram representing the operating principle of the timepiece as equipped with orientation means according to the invention.

FIG. 4 is a circuit drawing explaining the functioning of the timepiece equipped with orientation means as in the invention. It comprises a time base 40 and a divider-driver 41 arranged to provide information concerning hours 5, minutes 6 and seconds 7. The date may be likewise displayed. These circuits are well known to the art and need not be described here in detail. In accordance with the invention, the watch further comprises orientation means for which the indications are displayed whenever the switch 13 is actuated. The operation is as follows: when the switch 13 is actuated, AND-gate 42 is enabled thereby passing a signal at 32 kHz coming from the oscillator. This signal is counted in a counter 43 which counts by steps of 360 and which in its turn controls a digital to analog converter 44 having at its outputs a first voltage E sin ωt and a second voltage E cos ωt. Effectively, there are two voltages out of phase π/2 and of which the frequency is equal to 32 kHz/360, i.e. $\omega = 2\pi \cdot 32 \cdot 10^3/360$ sec$^{-1}$. The two voltages are thereafter transformed into current, the first into I sin ωt and the second into I cos ωt through converters 45 and 46 in order to feed the first 47 and second 48 field detectors arranged at a right angle relative to one another. If θ is the angle which the direction of the north pole (N) makes relative to the orientation of the detecting means, the inductive field acting on the first and second detectors will be B sin θ and B cos θ respectively and there will be obtained at the output electrodes the voltage kIB sin ωt sin θ from the first detector and the voltage kIB cos ωt cos θ from the second detector. These two voltages, after having each passed through a differential amplifier respectively 49 and 50 are added in a summation circuit Σ51 for which the output voltage will be kIB cos (ωt−θ). Such voltage will be a maximum when ωt=θ, and will be determined by a peak detector 52 which will provide a signal blocking the indication furnished by counter 43 at this moment, such indication appearing then on the display as will be seen further on.

Thus, for instance, when the detector 48 has its sensitive surface directed towards the east, angle θ is 90° and the peak detector 52 will provide a signal only when angle ωt obtained from the value of the excitation currents I sin ωt and I cos ωt is also 90°, this corresponding to the contents of counter 43 equal to 90°. The table hereinbelow gives certain principal situations of the orientation arrangement relative to the angle ωt=θ:

| Orientation | Angle ωt = θ (°) |
| --- | --- |
| North | 0 or 360 |
| North - East | 45 |
| East | 90 |
| South - East | 135 |
| South | 180 |
| South - West | 225 |
| West | 270 |
| North - West | 315 |

The value provided by the peak detector 52 controls a latch circuit 53 which enables maintaining the value attained by the 360 step counter at the moment where θ=ωt. This value is decoded by the circuit 54 and following thereafter is displayed on a conventional display 55 and gives the angle from 0° to 360° which the orientation means may make relative to north. The circuit is completed by an inverter 56 which provides a logic 1 state when switch 13 is open. This signal will reset the orientation means to zero and thus interrupt the functioning thereof whereby the display digits 55 may thereafter be used as for example to display the date.

From the circuit of FIG. 4 as in the other circuits to be hereinafter described, it is seen that advantages are obtained from using the oscillator 40 which is already present in the watch and functions as a time base additionally to provide energization for the orientation means. The same may be said of certain displays and of the decoder-drivers associated therewith, which are used at the same time for the display of time data and for the indication of the terrestrial magnetic field. Moreover, if one adds to this the fact that the timepiece may be in the form of a wrist-watch or a pocket-watch, it is clearly advantageous to bring together in the same unit the time keeping and compass functions.

Figure 5:
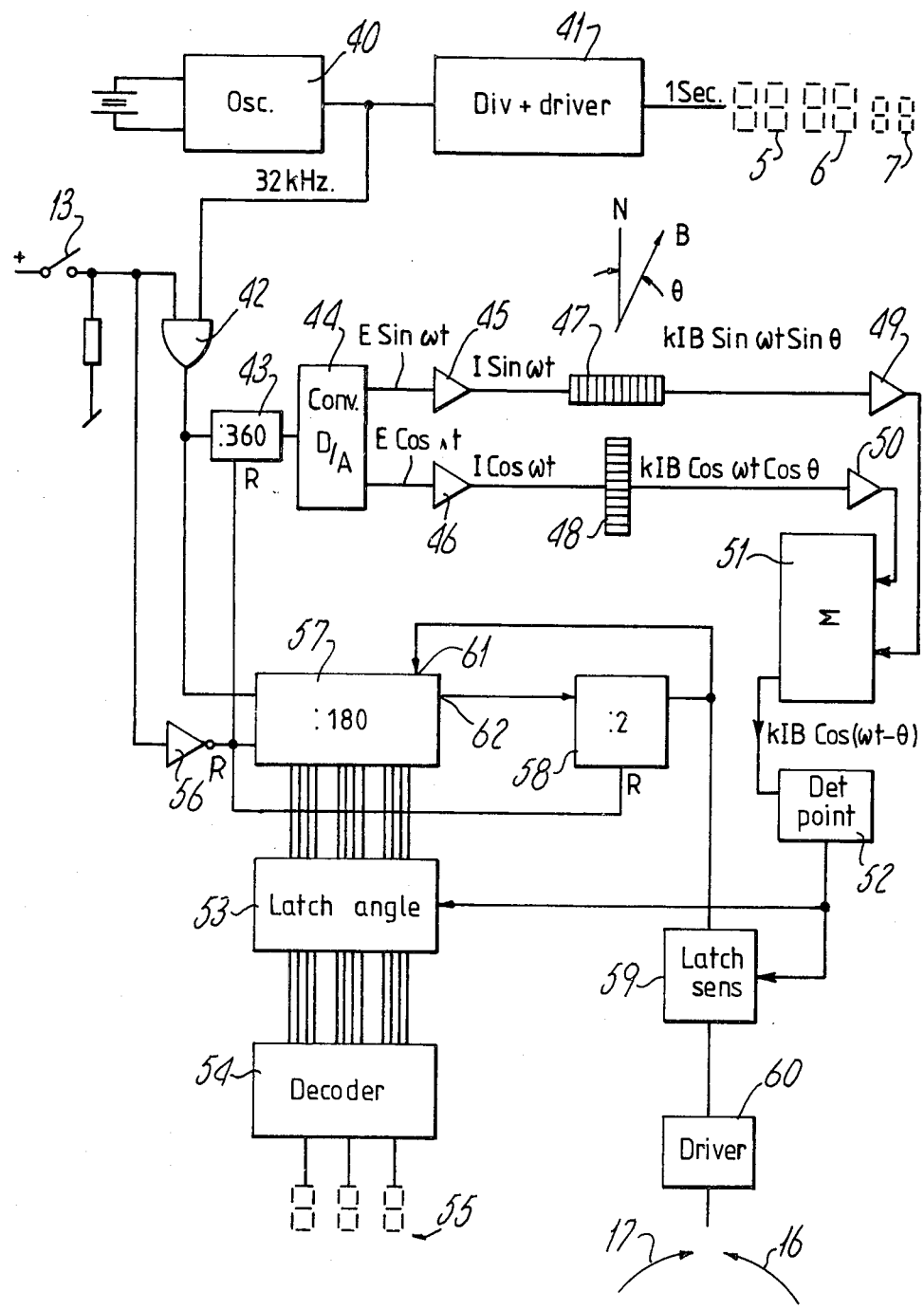
FIG. 5 is a circuit drawing representing the functioning of the timepiece as shown in FIGS. 1a to 1d.

FIG. 5 is a circuit drawing representing the functioning of the timepiece as illustrated in FIGS. 1a to 1d. In most case, for instance during direction finding exercises, there will be prescribed a known direction to be followed relative to north or, more precisely, an angle to the east or to the west of north. On such occasions, an indication based on 360° as will appear should one employ the schematic of FIG. 4, may be inconvenient. Effectively, if a prescribed direction of 88° east, for instance, should be read directly from the display, another prescribed direction, for instance 105° west, will be shown, using the FIG. 4 circuit as 255° and it will be necessary in respect of westerly directions to mentally subtract from 360° the angle given at the west in order to orient the compass in the proper direction. The arrangement shown in FIGS. 1a to 1d and realized according to the circuit of FIG. 5 overcomes this mentioned difficulty in a manner such that the horizon is divided in two half-circumferences, each of 180° situated on either side of the fixed axis 9. The explanations previously given indicate how to employ the timepiece illustrated on FIGS. 1a to 1d. The circuit for obtaining such an arrangement is shown in FIG. 5.

Certain elements in FIG. 5 have already been described in respect of FIG. 4 and will bear the same reference numbers. The output signal from gate 42, in addition to being directed to the first 360 step counter 43, is applied to a second 180 step counter 57. With state 0 on its input 61 circuit 57 counts the 32 kHz pulses coming from the oscillator (UP) and, with the state 1 on the same input, the circuit 57 counts down these pulses. When the watch is turned in the easterly direction, the counter 57 will count and display the angle in an increasing manner from 0° to 180°, as has been explained relative to FIG. 4. If the rotation of the watch exceeds the angle of 180°, counter 57 provides a carry-over at its output 62, which via flip-flop 58, will change the input 61 to the state 1. The counter 57 will then count down and display the westerly direction angle in a decreasing manner from 180° to 0°.

The circuit of FIG. 5 further shows that the output of flip-flop 58 is connected to the input of a latch circuit 59 controlled by the peak detector 52. Should this input be at the state 0, this indicates that the direction shown is to be found at the east of the fixed axis (0° to 180°), this effecting the energization of arrow 16 via driver circuit 60; if, on the contrary, this input is at the 1 state, such indicates that the direction displayed is to be found at the west (from 180° to 0°) of the fixed axis 9 and thus it is arrow 17 which will be energized.

As has been already mentioned, the indication of the digital value of the azimuth is not indispensable if it is a simple matter of aligning a map relative to the place where one is located. In this case circuits 53, 54 and the display 55 may be eliminated and the indications given by arrows 16 and 17 are sufficient.

Finally, the circuit of FIG. 5 shows an inverter 56 which acts on counters 43, 57 and the flip-flop 58 to assure that they are reset whenever the switch 13 is open. At this time, the display of arrows 16 and 17 is suppressed and digits 55 may be used to display the date.

FIG. 6 is a circuit drawing representing the operation of the timepiece illustrated in FIGS. 2a and 2b wherein one may find elements already described in respect of FIGS. 4 and 5. In particular, the digital display of the azimuth 14 (FIG. 6) is obtained in the same manner as the display of the azimuth 55 (FIG. 5). There is thus no need to go further into detail. The watch, according to the arrangement of FIG. 2a, displays hours by means of 60 liquid crystal segments and shows a minutes hand 31 and an hours hand 30. When the switch 13 is actuated, these hands are disconnected from the driver 41 and are employed to indicate the direction and the sense of the terrestrial magnetic field. This switching of the display of the segments is not shown in detail here since it is well known to the man skilled in the art and does not form part of the present invention.

In exiting from gate 42, the signal of 32 kHz in addition to being applied to the 360 step counter 43 and the count-down count-up counter 57 as has been explained relative to FIG. 5 is also applied to a six step counter 70, the output of which is connected to the input of a shift register 71 shifting by steps of 60. According to the configuration employed, hand 31 may take 60 positions distributed around the circumference and at each advance the hand will step by 6°. Thus, each time that the counter 70 receives 6 pulses of the signal coming from gate 42, it will cause the shift register 71 to advance by one step. Since the register is followed by a latch 72 controlled by the peak detector 52, hand 35 will have its angular position determined for an angle $\theta$ corresponding to the angle $\omega t$ in accordance with the principle explained above. Thus the stroke 35 gives the direction and the sense of north and according to the example of FIG. 6 shows the direction 45° east.

As has already been said concerning FIGS. 4 and 5, a state 1 will appear at the output of inverter 56 when switch 13 is inactivated. At this time, display 14 is available in order to display the date 32 as has been seen on FIG. 2a.

As already mentioned, if there is simply a question of orienting a map in the north direction, the indication given by the stroke 35 is sufficient and it will be possible to suppress indications relative to the angle and so simplify the circuit of FIG. 6 by eliminating elements 53, 54, 57 and 58.

Figure 7:
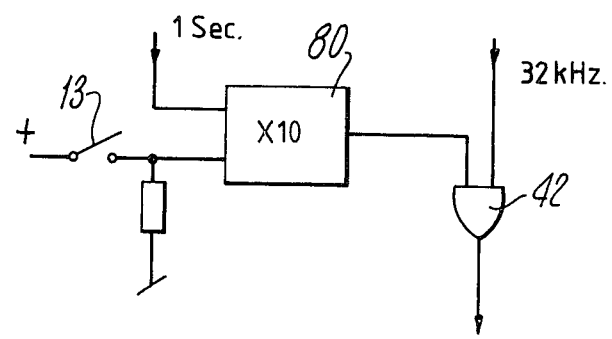
FIG. 7 is a circuit drawing applicable as a variant to any of the circuits as shown in FIGS. 4, 5 and 6.

FIG. 7 is a circuit diagram applicable as a variant to any of the circuits shown in FIGS. 4, 5 or 6. As has already been explained, the Hall detectors must be energized via their electrodes A—A' (see FIG. 3b). In the present state of knowledge, the feed current is of a considerable magnitude in order to assure a proper operation of the detector. With the relatively low energy capacities of the batteries used in watches, should one wish to avoid rapid run-down thereof, it is indispensable to limit the time during which the orientation means is utilized. In order to achieve this purpose, the arrangement as shown in FIG. 7 may be employed, where there is to be found interposed between switch 13 and gate 42 as shown on the circuits of FIGS. 4, 5 and 6, a tens counter 80. When the switch is actuated, the output of counter 10 goes to state 1 and enables gate 42. This state continues until 10 pulses have been counted, each spaced apart one second and applied to the input of counter 80 from the watch divider. At the end of this count, the output of the counter goes to the state 0 thereby blocking gate 42. Thus, in this example, the utilization of the compass is limited to a duration of 10 seconds. Other durations might likewise be chosen.

As has been previously described, indication of the sense in which the timepiece must be turned in order to align the fixed axis with the north is obtained by electro-optical display means (arrows 16, 17 or stroke 35). It will be understood however that this indication might also be obtained by means of an acoustic signal which could be heard as long as the alignment was not completed. For this arrangement, two different audible frequency sounds can be provided, one serving to indicate when the alignment is to the east and the other when such alignment is to the west of the north. The indication of the rotation sense might then be obtained by a sound of decreasing intensity as the alignment was approached.

The invention is not limited to the variants as shown in FIGS 1a to 1d and 2a and 2b. There exist other possible combinations between the display of time and the display of the direction and of sense of the terrestrial magnetic fied. For instance, a double-faced watch such as has been described in U.S. Pat. No. 4,236,239 could present on one of its surfaces the timekeeping function and on the other the compass function. The invention could likewise be applied to an articulated watch comprising at least two cases coupled through a link, the first containing the watch and the second the orientation means. In the examples given above, the calendar display has been employed to advantage to display the azimuth angle when the timepiece is employed as a compass. Should the watch provide a chronograph function, the indications employed to obtain this function could likewise be employed to show the azimuth value.

The unit employed in the examples hereinabove to display the azimuth is degrees. It is obvious that one may employ another unit as measure, e.g. the radian or the artillery measure on one thousand. In this case, it will be sufficient to change the counting basis of counters 43 and 57 as shown in the drawings.

Finally, it will be understood that the system as described hereinabove may include electronic means which permits regulation of the declination. A given angle may be introduced into the memory as part of the electronic circuit of the watch in order to correct variable errors in space and in time owing to the declination.

What we claim is:

1. An electronic timepiece including a display means arranged to display time data and orientation means sensitive to the direction and sense of the terrestrial magnetic field wherein said orientation means comprises a static detector and an electro-optic display arranged to display data from said detector, said timepiece further including a fixed axis wherein the data displayed by said electro-optic display includes an independent digital indication of only the sense in which the display should be turned in order to align said fixed axis with the terrestrial magnetic field in the most expeditious manner.

2. An electronic timepiece as set forth in claim 1 wherein the static detector comprises a combination of two Hall effect probes of which the sensing surfaces are provided with flux concentrators in order to increase the magnetic induction acting on said surfaces.

3. An electronic timepiece as set forth in claim 1 comprising a unique oscillator acting simultaneously as a time base for time data information and energization means for the static detector in order to display the direction and sense of the terrestrial magnetic field.

4. An electronic timepiece as set forth in claim 1 wherein the electro-optic display further provides a number indicative of the angle between said fixed axis and the axis of the terrestrial magnetic field.

5. An electronic timepiece as set forth in claim 4 wherein said number may have a value between 0 and 180, whereby the indication of the sense in which the display must be turned provides information as to whether the fixed axis is to the east or to the west of the axis of the terrestrial magnetic field.

6. An electronic timepiece as set forth in claim 1 wherein the indication of the sense is in the form of an arrow having its point directed toward the fixed axis.

7. An electronic timepiece as set forth in claim 1 wherein is further included means for providing an acoustic signal adapted to indicate the sense in which the display must be turned.

8. An electronic timepiece as set forth in claim 1 in which time data and orientation data appear sequentially in response to actuation of a manual control means and in which time data are displayed by means of a liquid-crystal-means digital cell for a number indicating time, the orientation data being displayed by the same elements of the same liquid crystal cell means.

9. An electronic timepiece as set forth in claim 8 wherein the digital cell for indicating the date is used to indicate the angle between the fixed axis and north whenever the manual control means is actuated to effect display of orientation data.

10. An electronic timepiece as set forth in claim 8 wherein display of orientation data following actuation of said manual control means is under control of a timing circuit whereby display of such data is limited to a predetermined time duration.

11. An electronic timepiece comprising:
first means for generating time data;
a fixed axis indication on said timepiece visible from the exterior of said timepiece;
second means for sensing the terrestrial magnetic field and generating data relating to the direction of said terrestrial field relative to said fixed axis;
third means including a stroke means and being responsive to said first means for displaying said time data with said stroke means and being responsive to said second means for displaying the sense of the terrestrial field relative to said fixed axis with said stroke means; and,
switch means for connecting either said first means or said third means to said second means so that said stroke means can alternately be used to indicate time or direction.

12. An electronic timepiece as claimed in claim 11 wherein said first and second means share a single oscillator for driving both said first and said third means.

13. An electronic timepiece as claimed in claim 11 wherein said third means also comprises digital display means whereby said time data or data relating to the direction of said terrestrial field relative to said fixed axis may be digitally displayed.

14. A timepiece as claimed in claim 11 wherein said third means comprises two means for displaying a first or a second indicator indicating the direction said timepiece should be moved so that said fixed axis coincides with said terrestrial magnetic field.

* * * * *